Aug. 2, 1960 H. GALLINA 2,947,820

SIGNAL TRANSFER AND GUIDE FIXTURE FOR MAGNETIC INFORMATION MEDIUM

Filed Nov. 8, 1954

INVENTOR
HAROLD GALLINA
BY Campbell, Brumbaugh, Free and Graves
HIS ATTORNEYS 2,947,820

SIGNAL TRANSFER AND GUIDE FIXTURE FOR MAGNETIC INFORMATION MEDIUM

Harold Gallina, 40 Park View Ave., Belleville 9, N.J.

Filed Nov. 8, 1954, Ser. No. 467,272

11 Claims. (Cl. 179—100.2)

This invention relates generally to apparatus for providing information transference with a magnetic information medium. More particularly, this invention relates to a signal transfer and guide fixture adapted to be incorporated in such apparatus.

In apparatus of the sort described above, a magnetic signal transfer head is utilized to effect a transference of information between the head and a magnetic information medium such as magnetic tape, or a magnetic sound track on a motion picture film. This transference of information may take the form of recording the information on the medium, or, alternatively, of reproducing the information from the medium. In either case, for effective transference of information, the information medium must cooperate with the head under precisely controlled conditions.

With regard to these conditions, as one consideration, if the information medium in its travel past the head, undergoes any substantial amount of lateral movement (movement normal to its line of travel), an undesirable amount of distortion will ensue in the information transference. As another consideration, in order to effect information transference, the information medium is maintained in pressure contact with a signal transfer face of the signal transfer head. If, in the course of information transference, the amount of contact pressure happens to vary, an additional distortion in the information transference will be produced.

Hence, it will be seen that, in the course of information transference, it is necessary to forestall both lateral movement of the information medium and variance in the contact pressure thereof with the face of the signal transfer head.

The prior art obtains the necessary control over the two mentioned distortion-producing factors by the use of a relatively large number of parts. For example, in order to forestall lateral movement of the medium, it is customary in the prior art to use a pair of separate guide members spaced to either side of the magnetic head, each member receiving the medium in a guideway which restrains the medium from lateral movement thereof. It is also customary in the prior art, in order to maintain constant pressure between the medium and the head, to use one or more additional members, such as a felt pad or two posts, these last-named members forcing the medium against the head. It will be appreciated that such prior art expedients are disadvantageous in that they involve an undue number of components, occupy undue space, and cause excessive wear of the tape as a result of the multiple places where the medium is contacted in its line of travel.

It is an object of the invention, accordingly, to provide a signal transfer and guide fixture which is free of the above-noted disadvantages of the prior art.

A further object of the invention is to provide a fixture of the above-noted character which is simple in construction and hence simple and inexpensive to manufacture.

Another object of the invention is to provide a fixture of the above-noted character suitable for use as an attachment.

Yet another object of the invention is to provide apparatus incorporating a fixture of the above-noted character for maintaining constant tension in the magnetic information medium.

These and other objects of the invention are realized, according to the invention, by providing a signal transfer and guide post adapted to be used in conjunction with a magnetic information strip, and a magnetic signal transfer head with a convex signal transfer face. The post is characterized in structure by an outer surface of convex contour in planes normal to the post axis, a guideway for the strip cutting through the mentioned surface crosswise to the post axis, a pair of marginal edges at the bottom of the guideway and lying in a plane chordal to the convex contour of the post surface, and a concave recess formed in the bottom of the guideway between the mentioned marginal edges. The post is adapted to be so located with respected to the signal transfer head that the convex signal transfer face of the head projects beyond the mentioned chordal plane into the concave recess of the post. As a result, when the magnetic information strip is received into the guideway in stretched relation over the marginal edges, the strip will be bowed in constant pressure relation over the convex face of the head. The guideway itself is properly shaped and dimensioned to forestall any lateral movement of the strip at its place of contact with the head.

As a feature in accordance with the present invention, the signal transfer head is connected with the post by a bracket means which supports the head in its proper location thereof with respect to the concave recess in the post. This bracket means is constructed to provide for one or more rotary or translatory adjustments in the position of the head.

As another feature of the invention, the described fixture may be mounted upon a rocker arm to maintain the strip under constant tension.

The invention will be better understood from the following description of an illustrative embodiment thereof, taken in conjunction with the accompanying drawings, wherein.

Figure 1:
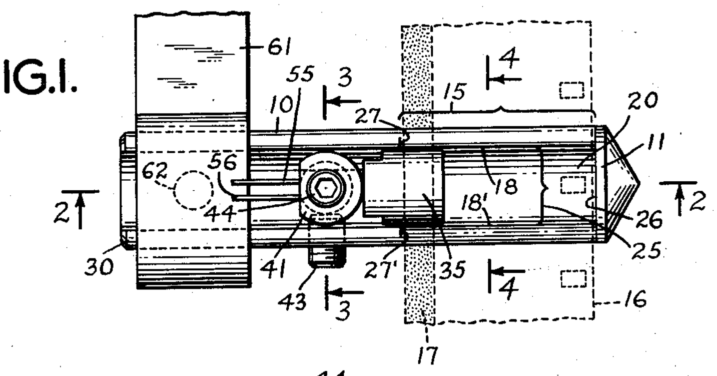
Fig. 1 is a plan view of a signal transfer and guide fixture illustrative of the present invention.

It will be understood that while the present invention may be used with any information strip adapted to have its information magnetically impressed thereon, for convenience the invention will be illustrated in connection with a motion picture film having a magnetic sound track, which, for example, supplements the usual optical sound track on the film.

Referring now to the figures, the numeral 10 designates a post having an outer surface 11 of convex contour in planes normal to the post axis. Preferably, the surface 11 is a cylindrical surface of arcuate contour in the mentioned planes. In the shown embodiment, the surface 11 conforms to a right circular cylinder.

The post 10 has formed therein a guideway 15 for a magnetic information strip 16 in the form of a motion picture film with a magnetic track 17. Guideway 15 is formed in post 10 to cut through the surface 11 crosswise to the post axis. In structural configuration, the guideway 15 is characterized by a pair of marginal edges 18, 18' in the bottom of the guideway and a concave recess 20 formed in the guideway bottom between the edges 18, 18'.

Preferably, the guideway 15 takes the form of a concave groove 25 incised in the surface 11 to run in the direction of the post axis. In this case, the mentioned marginal edges 18, 18' are formed at the lengthwise running junctions of the groove 25 with the surface 11. To furnish the desired guiding action which forestalls lateral movement of the strip 16, in connection with the groove 25 (which is at the bottom of the guideway), there is provided a pair of crosswise-running side walls for the guideway, the side walls being spaced apart by substantially the width of the strip 16. One of these side walls may take the form of the shoulder 26 (Figs. 1 and 2) formed in the post 10, while the other side wall may take the form of the shoulders (Figs. 1, 2 and 4) respectively designated 27, 27'.

Figure 2:
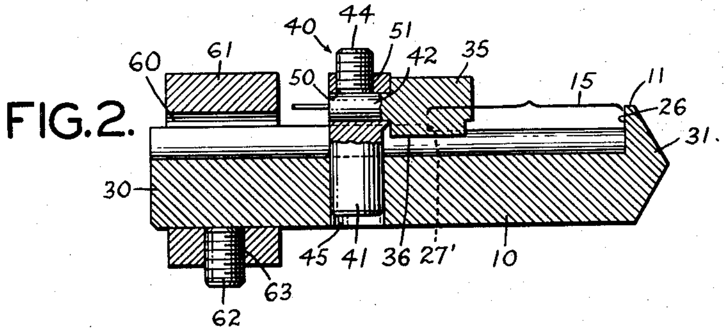
Fig. 2 is a side elevation of the fixture of Fig. 1 taken in cross section as indicated by the arrows 2—2 of Fig. 1.

For simplicity and inexpensive of manufacture, the groove 25 may be incised in the post 20 by forming the groove with a milling operation or the like, such that the groove runs from the butt end 30 of post 10 to terminate short of the tip 31 of the post. With such construction, the shoulder 26 will be formed at the termination of the groove. In order to form the opposite shoulders 27, 27', the edges 18, 18' (as best shown in Figs. 1, 2 and particularly in Fig. 4) may be rounded-down for an extent running from the shoulder 26 towards the butt end 30 to a point short of the butt end, the mentioned point being spaced away from the shoulder 26 by substantially the width of the strip 16. With rounding down of the edges 18, 18' in the manner described, the shoulders 27, 27' will be formed in the manner shown.

Considering the relation of the marginal edges 18, 18' to the rest of the post structure, it will be seen that the edges 18, 18' lie in an imaginary plane which is chordal to the hitherto-described convex contour of the surface 11. The fact that the edges 18, 18' lie in a chordal plane is of significance as will be evident hereafter.

Figure 4:
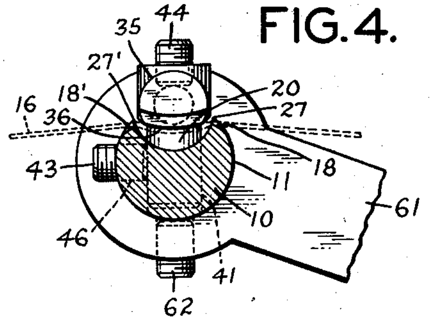
Fig. 4 is a front elevation of the fixture of Fig. 1 taken in cross section as indicated by the arrows 4—4 of Fig. 1.

The post 10 with its characteristic structure is adapted to be used with a magnetic signal transfer (recording and/or reproducing) head 35 having a convex signal transfer face 36 best shown in Fig. 4. Since the internal structure of the head 35 is well known and is no part of the present invention, no showing or description of the said internal structure is deemed necessary herein. The head 35 is properly located with respect to the post 10 when (as best shown in Fig. 4) the convex signal transfer face 36 projects beyond the imaginary chordal plane defined by the edges 18, 18', the face 36 thus projecting into the concave recess 20 between the two mentioned edges.

In connection with the location of head 35 relative to the post 10, in operation the strip 16 is received in the guideway 15 (Figs. 1 and 4) under tension caused, for example, by an upwardly directed force exerted by the post 10 upon the strip. It follows that the strip 16 will be slightly bent in its direction of lengthwise trend at each of the marginal edges 18, 18' (Fig. 4) such that the strip assumes a wrap about the rounded-down lengthwise portions of the edges 18 and 18', and possibly about limited portions of the surface 11 adjacent to these rounded down portions. It also follows that the strip 16 will tend to draw taut between the edges 18, 18' to thus tend to lie in the chordal plane therebetween. The convex signal transfer face 36, however, projects, as described, beyond the chordal plane. Accordingly, under the operating conditions described, the strip 16 intermediate the edges 18, 18' will be bowed over the signal transfer face 36. The described slight wrap of strip 16 provides isolation (through friction) of the portion of strip 16 between the edges from the forces acting on the rest of the strip. Thus, a constant pressure condition is maintained between strip 16 and face 36 despite fluctuations in force acting on the remainder of the strip. At the same time, the strip 16 is restrained by the shoulder 26 and the shoulders 27, 27' (Fig. 1) from undergoing any significant lateral movement with respect to the signal transfer face 36. Thus, the described fixture affords information transference between the head and the strip in a manner which is free of distortion caused either by lateral movement of the strip or variance in the contact pressure thereof with respect to the signal transfer face.

Of course, in the course of information transference, the head 35 should be positioned in the post axis direction such that its face 36 properly registers (Fig. 1) with the magnetic information track, as, say, the track 17 on strip 16.

Figure 3:
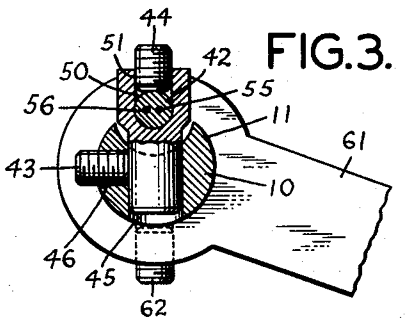
Fig. 3 is a front elevation of the fixture of Fig. 1 taken in cross section as indicated by the arrows 3—3 of Fig. 1.

Conveniently, the head 35 may be properly located, as described with respect to the post 10, by the use of a bracket means generally designated by the numeral 40 (Fig. 2). Since the head 35 must be aligned to closely controlled tolerances with the guideway 15, and since in manufacturing it is difficult to achieve these close tolerances in a unit where the head 35 is integrally joined with the post 10, preferably the bracket means 40 is of a form to render the head 35 adjustable in position by one or more modes of adjustment. To this end, the bracket means 40 may be comprised of first and second members 41, 42 in the form of pins and first and second securing means 43, 44 (Fig. 3) in the form of set screws. In the construction of the bracket means, the pin 41 is received in adjustable rotary and translatory relation into a socket 45 formed in the post 10 in spaced relation from the guideway 15 such that pin 41 projects radially outward from post 10. The set screw 43 is contained in threaded relation in a hole 46 in post 10 communicating from the exterior thereof to the socket 45. Hence, set screws 43 will engage with pin 41 to secure the same in place. By loosening and tightening the set screw, the pin 41 may be secured in any desired rotary and translatory position within the socket 45.

To complete the construction of the bracket means, the pin 42 is received in adjustable rotary and translatory position within a socket 50 formed in pin 41 in spaced relation from the post 10 such that pin 42 projects radially outward from pin 41. In like manner to that described for pin 41 and set screw 43, the pin 42 may be secured in any desired rotary and translatory position within socket 50 by the set screw 44 threaded through a hole 51 in pin 41 to engage with the portion of pin 42 in socket 50. The pin 42 carries at the end thereof removed from socket 50, the signal transfer head 35 in properly disposed location with respect to the guideway 15.

For convenience, the lead wires 55, 56 for head 35 may be lead out through the pin 42. Through rotary and translatory adjustment of pin 41 in socket 45, the head 35 may be given respective adjustments in its angular position about a line perpendicular to the post axis direction, and in its translatory position towards or away from post 10. Also, by rotary and translatory adjustment of the pin 42 in socket 50, the signal transfer head 35 may be given respective adjustments in its angular position about an axis perpendicular to the mentioned line and in its translatory position in the post axis direction. Each of these adjustments is separately useful in obtaining a proper over-all alignment of the signal transfer head 35 with the guideway 15. Preferably the described adjustments are made at the factory, no furtheir alignment ordinarily being necessary during the life of the fixture.

In view of the description above, it will be seen that the described signal transfer and guide fixture reduces to a single part the multiple parts restraining the magnetic information strip from lateral movement and maintaining constant pressure contact thereof with the signal transfer head. The described fixture is also characterized by other advantages. For example, the fixture occupies much less space than prior art arrangements used for the same purposes. Also, because of its simple structure, the fixture can be manufactured with simplicity and cheapness. As compared with the prior art, the fixture affords a reduction of wear on the magnetic information strip ensuing from the fact that (apart from the head 35 itself) the fixture contacts the strip only at the minimum number of two places (the edges 18, 18'). As another advantage, it has been found that the described fixture can cope with a warped or wrinkled magnetic information strip much better than the arrangements used for the same purposes by the prior art.

It will be recognized that the above-described fixture is useful in any apparatus constructed to obtain information transference between a magnetic information medium and a magnetic signal transfer head. As a particular use, because of its compactness, and incorporation into a single part of a number of prior art parts, the described fixture is of highly useful application as an attachment to an apparatus which in its usual commercially available form is not equipped for magnetic information transference. Thus, for example, the described fixture may be attached to a motion picture projector operable with a film having a magnetic track either as the main sound track or supplementing the optical sound track. By use of the fixture as such attachment, the sound may be conveniently dubbed-in on the film following exposure and development of the pictures on the film to provide, for example, a running commentary on the pictures. Subsequently, of course, the same attachment may be utilized in the projector to reproduce the magnetically recorded sound.

Figure 5:
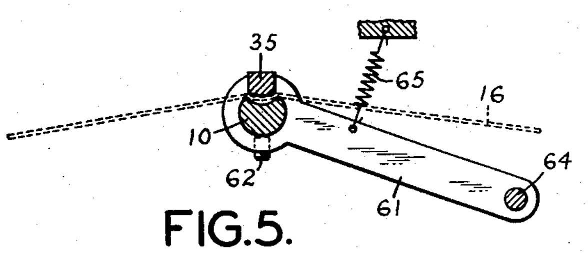
Fig. 5 is another view of the fixture, taken generally in the same manner as Fig. 4, but showing details of the rocker arm to which the fixture may be attached.

As a further consideration, in magnetic information transference apparatus it is often necessary that the magnetic information strip in the course of its travel through the apparatus be maintained under constant tension. Such constant tension condition may be obtained by receiving (Figs. 1 and 5) the butt end 30 of the post 10 into a socket 60 (Fig. 2) in a rocker arm 61 such that the post projects at right angles outwards from the rocker arm. To secure the post 10 to the rocker arm there may be used a set screw 62 passing in threaded relation through a hole 63 in the rocker arm to engage with the portion of the post in socket 60. The rocker arm 61 itself is pivoted (Fig. 5) at the end thereof away from post 10 by a pin 64. For pivotal movement about pin 64, the rocker arm 61 is loaded by a tension spring 65 tending to rotate the rocker arm such that the post 10 exerts a substantially constant force against a section of strip 16. This force so exerted by post 10 on strip 16 maintains the strip under constant tension during its course of travel in the remainder of the apparatus (not shown) with which it is used. Moreover, any slack in the strip 16 will be taken up by movement of the rocker arm 61 under the urging of spring 65.

The above-described embodiment of the invention, being illustrative only, it will be appreciated that the invention herein comprehends organizations differing in form or detail from the described embodiment. Accordingly, the invention is not to be considered as limited save as is consonant with the scope of the following claims.

I claim:

1. A signal transfer and guide fixture for a magnetic information strip comprising, a post characterized in structure by an outer surface of convex contour in planes normal to the post axis, a recessed guideway for said strip cutting through said surface crosswise to said axis, said guideway being characterized by a pair of crosswise running side walls spaced apart by slightly more than the width of said strip and adapted to preclude substantial lateral movement of said strip, a pair of lengthwise running edges located where opposite margins of the guideway bottom meet with said surface, said edges lying in a plane chordal to the convex contour of said surface, a concave recess formed in the guideway between the marginal edges, and bracket means adapted to support a signal transfer head having a convex signal transfer face so that said convex signal transfer face projects beyond said chordal plane into said concave recess, said bracket means being mechanically coupled with said post to be operably maintained in predetermined position in relation thereto, and said fixture upon receiving said strip in said guidway in stretched relation over said edges being adapted to bow said strip over said convex signal transfer face.

2. A signal transfer and guide fixture for a magnetic information strip comprising, a post characterized in structure by an outer surface of convex contour in planes normal to the post axis, a recessed guideway for said strip cutting through said surface crosswise to said axis, said guideway being characterized by a pair of crosswise running side walls spaced apart slightly more than the width of said strip and adapted to preclude substantial lateral movement of said strip, a pair of lengthwise running edges located where opposite margins of the guideway bottom meet with said surface, said edges lying in a plane chordal to the convex contour of said surface, and a concave recess formed in the guideway bottom between the marginal edges, said fixture also comprising a magnetic signal transfer head with a convex signal transfer face, and bracket means mechanically coupled with said post to be operably maintained in predetermined position in relation thereto, said bracket means supporting said head from said post such that said convex signal transfer face projects beyond said chordal plane into said concave recess, and said fixture upon receiving said strip in said guideway in stretched relation over said edges being adapted to bow said strip over said convex signal transfer face.

3. A signal transfer and guide fixture as in claim 2 in which the bracket means renders the signal transfer head adjustable in rotation with respect to its angular position about an axis lying in a plane parallel to the post axis direction.

4. A signal transfer and guide fixture means as in claim 2 in which the bracket means renders the signal transfer head adjustable in translation with respect to its position in the post axis direction.

5. A signal transfer and guide fixture means as in claim 2 in which the bracket means renders the signal transfer head adjustable in rotation with respect to its angular position about a line perpendicular to the post axis direction.

6. A signal transfer and guide fixture means as in claim 2 in which the bracket means renders the signal transfer head adjustable in translation with respect to its spacing towards or away from the concave recess.

7. A signal transfer and guide fixture means as in claim 2 in which the bracket means comprises a first member received in adjustable rotary and translatory relation into a socket in said post spaced from said guideway and aligned such that said socket holds said member in radially projecting relation from said post, first securing means for holding said first member in a selected rotary and translatory position with respect to said post, a second member received in adjustable rotary and translatory relation into a socket in said first member spaced from said post and aligned such that said last-named socket holds said second member in radially projecting relation from said first member, said second member supporting said signal transfer head opposite the concave recess in said guideway, and second securing means for holding said second member in a selected rotary and translatory position with respect to said first member.

8. A signal transfer and guide fixture means as in claim 7 wherein first and second members are each pins, and said first and second securing means are each set screws.

9. A signal transfer and guide fixture for a magnetic infomation strip comprising a post characterized in structure by an outer cylindric surface of arcuate contour in planes normal to the axis of said post, a concave groove incised in said surface to run in the post axis direction, said groove forming a guideway for said strip cutting through said surface crosswise to said axis, said guideway being characterized by a pair of crosswise running side walls spaced apart by slightly more than the width of said strip and adapted to preclude substantial lateral movement of said strip, said guideway also being characterized by a pair of lengthwise running bottom edges at the lengthwise junctures of said groove with said surface, said edges lying in a plane chordal to the arcuate contour of said surface, said fixture also comprising a magnetic signal transfer head with a convex signal transfer face, and bracket means mechanically coupled with said post to be operably maintained in predetermined position in relation thereto, said bracket means supporting said head from said post such that said convex signal transfer face projects beyond said chordal face into said groove, and said fixture upon receiving said strip in said guideway in stretched relation over said edges being adapted to bow said strip over said convex signal transfer face.

10. A signal transfer and guide fixture for a magnetic information strip comprising, a post having a butt end and characterized in structure by an outer cylindric surface of circular contour in planes normal to the post axis, a concave groove incised in said surface to run in the post axis direction from the butt end of said post to a termination short of the tip thereof, said groove at its termination forming a first crosswise running side wall of a strip guideway cutting through said surface crosswise to said axis, and a pair of rounded-down marginal edges for said groove running in the post axis direction from said termination back towards said butt end to a point short of said butt end, said rounded-down edges forming at said point a second crosswise running side wall for said guideway spaced from said first side wall by slightly more than the width of said strip whereby said two side walls are adapted to preclude substantial lateral movement of said strip, said rounded-down edges lying in a plane chordal to the circular contour of said surface, said fixture also comprising a magnetic signal transfer head with a convex signal transfer face, and bracket means mechanically coupled with said post to be operably maintained in predetermined position in relation thereto, said bracket means supporting said head from said post such that said convex signal transfer face projects beyond said chordal face into said groove between said rounded-down edges, and said fixture upon receiving said strip in said guideway in stretched relation over said edges being adapted to bow said strip over said convex signal transfer face.

11. A signal transfer and guide fixture for a magnetic information strip comprising, a post characterized in structure by an outer cylindric surface of circular contour in planes normal to the post axis, a concave groove incised in said surface to run in the post axis direction from the butt end of said post to a termination short of the tip thereof, said groove at its termination forming a first crosswise running side wall of a strip guideway cutting through said surface crosswise to said axis, and a pair of rounded-down marginal edges for said groove running in the post axis direction from said termination back towards said butt end to a point short of said butt end, said rounded-down edges forming at said point a second crosswise running side wall for said guideway spaced from said first side wall by slightly more than the width of said strip whereby said two side walls are adapted to preclude substantial lateral movement of said strip, said rounded-down edges lying in a plane chordal to the circular contour of said surface, said fixture also comprising a first pin received in adjustable rotary and translatory relation into a socket in said post spaced from said guideway and aligned such that said first pin projects radially outwards from the post, a first set screw threaded through a hole in said post such that said first set screw engages with said first pin to secure the same in a selected rotary and translatory position with respect to said post, a second pin received in adjustable rotary and translatory relation into a socket in said first pin spaced from said post and aligned such that said second pin projects radially outwards from said first pin, a second set screw threaded through a hole in said first pin such that said second set screw engages with said second pin to secure the same in a selected rotary and translatory position with respect to said first pin, and a signal transfer head with a convex signal transfer face mounted on said second pin, said head being supported by said first and second pins such that said convex signal transfer face projects beyond said chordal plane into said groove between said rounded-down edges, said fixture upon receiving said strip in said guideway in stretched relation over said rounded-down edges being adapted to bow said strip over said convex signal transfer face.

References Cited in the file of this patent

UNITED STATES PATENTS

| | | |
|---|---|---|
| 610,441 | Ganoung | Sept. 6, 1898 |
| 2,255,232 | Stern | Sept. 9, 1941 |
| 2,513,653 | Kornei | July 4, 1950 |
| 2,530,584 | Pontius | Nov. 21, 1950 |
| 2,551,845 | Lindsay | May 8, 1951 |
| 2,644,690 | Krag | July 7, 1953 |
| 2,644,856 | Pettus | July 7, 1953 |
| 2,721,743 | Erikson et al. | Oct. 25, 1955 |
| 2,773,416 | Kleinerman | Dec. 11, 1956 |

FOREIGN PATENTS

| | | |
|---|---|---|
| 286,555 | Switzerland | Oct. 31, 1952 |
| 1,033,310 | France | Apr. 1, 1953 |